Figure 1:
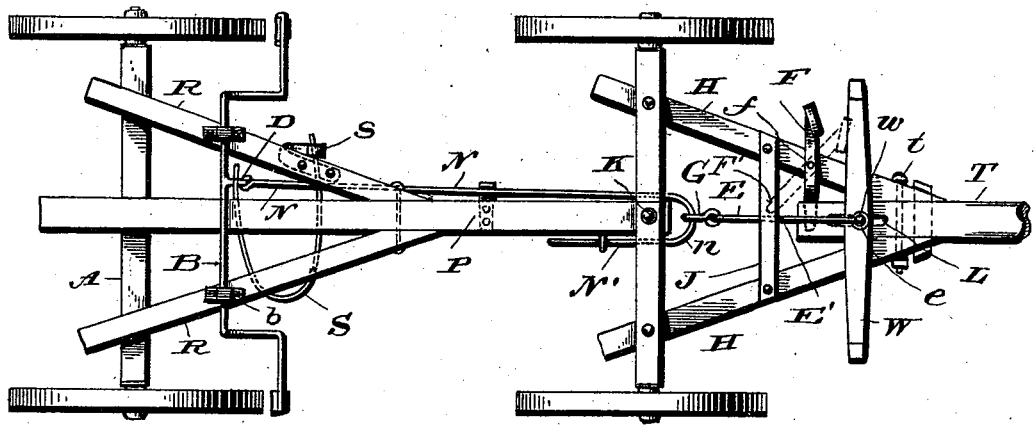

(No Model.)

W. P. WIGLEY.
AUTOMATIC BRAKE.

No. 525,173. Patented Aug. 28, 1894.

Witnesses:
L. C. Hills
J. H. Jochum Jr.

Inventor:
William P. Wigley,
by Collamer & Co.,
Attorneys.

UNITED STATES PATENT OFFICE.

WILLIAM P. WIGLEY, OF DALLAS, GEORGIA.

AUTOMATIC BRAKE.

SPECIFICATION forming part of Letters Patent No. 525,173, dated August 28, 1894.

Application filed April 30, 1894. Serial No. 509,518. (No model.)

*To all whom it may concern:*

Be it known that I, WILLIAM P. WIGLEY, a citizen of the United States, and a resident of Dallas, Paulding county, State of Georgia, have invented certain new and useful Improvements in Automatic Brakes; and my preferred manner of carrying out the invention is set forth in the following full, clear, and exact description, terminating with claims particularly specifying the novelty.

This invention relates to carriages and wagons, and more especially to automatic brakes employed on wagons having tongues; and the object of the same is to effect certain improvements in brakes of this character.

To this end the invention consists in the specific details of construction hereinafter more fully described and claimed, and as shown in the drawings, wherein—

Figure 2:
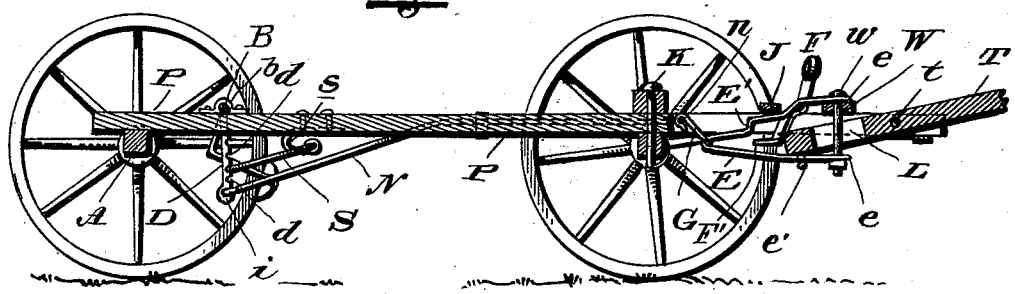

Figure 1 is a plan view of the running gear of a wagon with my improved brake applied thereto and the parts at rest as when it is not desired to apply the brake in either driving forward or backing the wagon. Fig. 2 is a central longitudinal section of the same, showing the tongue raised as in going down a hill and the brakes as applied.

Referring to the said drawings, the letter P designates the perch or pole connecting the rear axle A with the king bolt K.

R are the rear hounds and H the front hounds, and T is the tongue pivoted at $t$ between the hounds H in the usual manner.

B is the brake shaft which is preferably journaled in bearings $b$ near the rear axle A and has depending ends carrying brake shoes in the usual manner; and from this shaft depends an arm D having notches $d$ in its forward face.

S is a spring of preferably the shape indicated in Fig. 1, one end of which spring is secured in a suitable bracket or clamp $s$ beneath the perch or under one of the rear hounds R, while the other end of the spring takes into one of the notches $d$ in the depending arm D and presses said arm to the rear. By this construction it will be seen that the spring S will normally apply the brake shoes to the rear wheels, and the force with which they are applied can be regulated by seating the rear end of the spring in certain of the notches $d$. At the lower end of the arm D is an eye $i$ into which is linked a rod (or chain) N leading through suitable guides in the perch to and beyond the king bolt K and having a rounded loop $n$ at its front end struck on a circle around said king bolt, beyond which it is preferably continued around to the other side of the perch as at N' and passed through another suitable guide. The letter W designates the doubletree to which the team is attached, and through the center of this doubletree passes an upright pin $w$ which extends down through a longitudinal slot L in the tongue T in rear of its transverse pivot $t$.

E is a clevis whose extremities have eyes $e$ mounted on said pin $w$ above the doubletree and below the tongue, whose lower arm is straight and slides through a guide $e'$ beneath the rear end of the tongue, whose upper arm has a shoulder E' in rear of the tongue, and whose bend at the rear end is connected by a hook or link G with the rounded loop $n$ at the front end of the connecting rod N.

J is a cross bar connecting the front hounds H to where shown and standing in position to be engaged by the shoulder of the clevis. By this construction, when the team is hitched to the doubletree and started, the pin $w$ is drawn forward in the slot L, the clevis E is drawn forward until its shoulder E' passes under the cross bar J, the tongue then turns on its transverse pivot $t$ to raise the clevis until its shoulder engages in front of the cross bar, and such forward movement of the cross bar through the link G and loop $n$ obviously draws on the connecting rod N and depending arm D and throws the brake shoes off the rear wheels against the tension of the spring S. When the wagon has reached and commences to descend a hill, the holding back of the team will raise the front end of the tongue. This movement depresses its rear end and disengages the shoulder E' from in front of the cross bar J, whereby tension on the connecting rod N is removed and the spring S applies the brakes automatically. The loop $n$ at the front end of the connecting rod permits the above actions to take place whether the tongue stands in alignment with the perch or not.

It is often desirable as with a light load or when the wagon has to be frequently backed (which motion would raise the front end of the tongue the same as going down hill) that the brakes shall not be automatically applied; and to this end I have provided a foot lever F whose upper end stands within reach of the driver's foot, whose center is pivoted as at *f* upon one of the front hounds, and whose lower end F' has a lip so shaped and constructed that the turning of this foot lever will throw the lip under the rear end of the tongue whereby the latter will be prevented from descending and hence the front end of the tongue cannot be raised in going down hill or backing the wagon. In Fig. 1 I have illustrated this foot lever as in position to prevent the descent of the rear end of the tongue.

All parts of this device are of the desired sizes, shapes, materials, and proportions, and considerable change in the specific details of construction may be made without departing from the principle of my invention.

What is claimed as new is—

1. In an automatic brake, the combination with the brake shaft mounted in bearings and carrying brake shoes at its extremities, an arm depending from said brake shaft and provided with notches in its front face and an eye at its lower end, a connecting rod engaging said eye and leading forward, and means for drawing on said rod to release the brake; of an expansive spring connected at one end with the running gear and having its other end removably engaging one of said notches, as and for the purpose set forth.

2. In an automatic brake for wagons, the combination with the brake beam carrying shoes, a spring normally applying said shoes to the rear wheels, and a connecting rod leading from the beam to a point forward of the king bolt and there having a loop; of the tongue mounted on a horizontal pivot between the front hounds and having a longitudinal slot, the doubletree having a vertical pin moving in said slot, a cross bar on the hounds in rear of the tongue, a clevis whose ends are connected with said vertical pin above the doubletree and below the tongue, whose lower arm slides in a guide beneath the rear end of the tongue, and whose upper arm has a shoulder resting in front of the cross bar when the rear end of the tongue is raised, and a link connecting the rear end of the clevis in said loop, as and for the purpose set forth.

3. In an automatic brake for wagons, the combination with the brake beam carrying shoes, a spring normally applying said shoes, and a connecting rod leading forward from the beam; of the tongue mounted on a horizontal pivot between the front hounds, the doubletree sliding longitudinally on the tongue, a cross bar between the hounds in rear of the tongue, a clevis connected with the doubletree and having a shoulder resting in front of said cross bar when the rear end of the tongue is raised, and connections between the rear end of the clevis and said rod, as and for the purpose set forth.

4. In an automatic brake for wagons, the combination with the brake beam carrying shoes, a spring normally applying said shoes, and a connecting rod leading forward from the beam; of the tongue mounted on a horizontal pivot between the front hounds, the doubletree sliding longitudinally on the tongue, a cross bar between the hounds in rear of the tongue, a clevis connected with the doubletree and having a shoulder resting in front of said cross bar when the rear end of the tongue is raised, connections between the rear end of the clevis and said rod, and a foot lever pivoted on one hound and having a lip at its inner end adapted to be passed under the rear end of the tongue so as to prevent the latter from descending, as and for the purpose set forth.

5. In an automatic brake for wagons, the combination with the brake beam carrying shoes, a spring normally applying said shoes to the rear wheels, and a connecting rod leading from the beam to a point forward of the king bolt and there having a loop struck on a curve around the king bolt; of the tongue mounted on a horizontal pivot between the front hounds, the doubletree sliding longitudinally on the tongue, a cross bar between the hounds in rear of the tongue, a clevis connected with the doubletree and having a shoulder resting in front of said cross bar when the rear end of the tongue is raised, and a hook connected with the rear end of said clevis and hooking into said loop on the connecting rod, as and for the purpose set forth.

In testimony whereof I have hereunto subscribed my signature on this the 24th day of April, A. D. 1894.

WILLIAM P. WIGLEY.

Witnesses:
J. W. SMITH,
H. L. OWENS.